US009082148B1

(12) United States Patent
Oczkowski et al.

(10) Patent No.: US 9,082,148 B1
(45) Date of Patent: Jul. 14, 2015

(54) GROUPING PRODUCTS BY SIZE AND WEIGHT

(75) Inventors: Sean Joseph Henry Oczkowski, Waterloo (CA); Dennis Lee, Mercer Island, WA (US); Sarah T. Rowe, Seattle, WA (US); Paul N. Haake, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 851 days.

(21) Appl. No.: 12/719,895

(22) Filed: Mar. 9, 2010

(51) Int. Cl.

| | |
|---|---|
| ***G06Q 30/00*** | (2012.01) |
| ***G06F 17/30*** | (2006.01) |
| ***G06Q 30/06*** | (2012.01) |

(52) U.S. Cl.
CPC ........ *G06Q 30/0641* (2013.01); *G06Q 30/0601* (2013.01)

(58) Field of Classification Search
USPC ................................................ 705/26.1–27.2
See application file for complete search history.

(56) References Cited

U.S. PATENT DOCUMENTS 5,231,566 A * 7/1993 Blutinger et al. ............ 705/27.1
7,979,359 B1 * 7/2011 Young et al. .................. 705/332
8,086,344 B1 * 12/2011 Mishra et al. ................. 700/216
8,219,453 B1 * 7/2012 Iida et al. ..................... 705/26.1
2006/0080182 A1 * 4/2006 Thompson et al. ............. 705/26
2006/0083423 A1 * 4/2006 Brown et al. ................. 382/159
2006/0282339 A1 * 12/2006 Musgrove et al. .............. 705/27
2009/0125814 A1 * 5/2009 Willcock ...................... 715/738
2009/0210320 A1 * 8/2009 Adelman et al. ................ 705/27
2011/0055054 A1 * 3/2011 Glasson ....................... 705/27.2

OTHER PUBLICATIONS

Maurices boosts facility flow-through for complex, high-volume operations following successful implementation of supply chain execution solutions from HighJump software. (Mar. 16, 2005). Business Wire Retrieved from http://search.proquest.com/docview/445458852?accountid=14753.*

* cited by examiner

*Primary Examiner* — Kathleen Palavecino
(74) *Attorney, Agent, or Firm* — Lee & Hayes, PLLC

(57) ABSTRACT

Technologies are described herein for grouping products by size and weight. A customer-facing user interface is provided to a user that allows the user to browse and search products in a merchant system in order to identify products having similar size and weight. An extension to the customer-facing user interface facilitates the grouping of the products having similar size and weight into product groups. A source product is selected for each product group. The source product is used by the merchant system as the source for dimensional data for the products in the product group.

19 Claims, 13 Drawing Sheets

GROUPING PRODUCTS BY SIZE AND WEIGHT

BACKGROUND

A merchant may provide a number of varied products for sale to customers over the phone or via the Internet for delivery directly to the customer. Efficient handling and shipping of these products may be essential to the merchant's operation. To this end, the merchant may desire to maintain accurate dimensions and weights of all available products. For example, the merchant may use the dimensions and weights of each product in a multiple product order to determine the order in which the products are picked from inventory, the size of the containers needed to move the products to the packing location, the number and size of shipping containers or boxes required to ship the products in the order, and the orientation and manner in which each product will be packed for shipment. However, for a merchant that offers a large number of products for delivery, such as an online retailer, weighing and measuring each product may be a time consuming and resource intensive undertaking.

It is with respect to these and other considerations that the disclosure made herein is presented.

DETAILED DESCRIPTION

Figure 1:
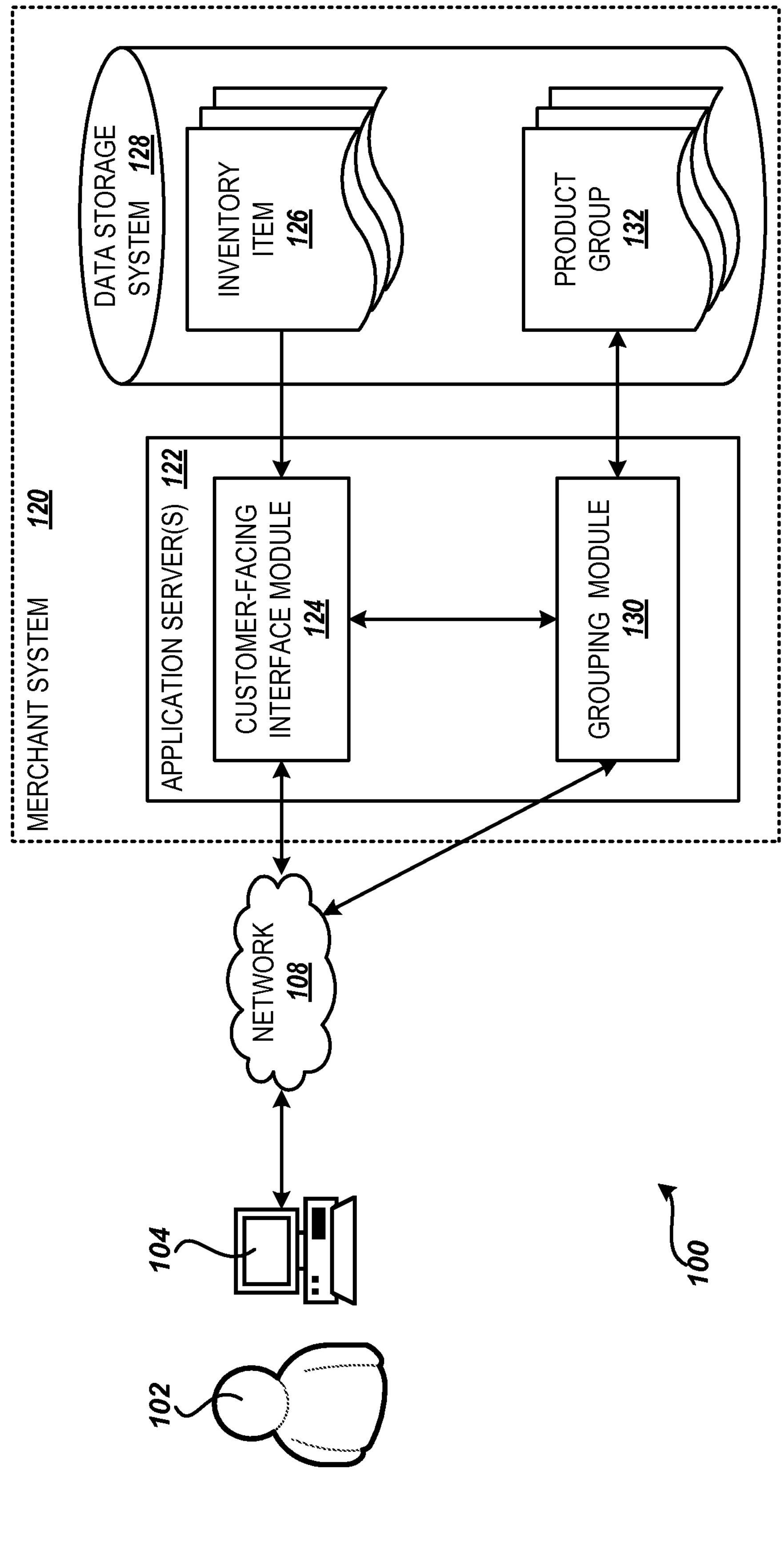
FIG. 1 is a system and network diagram showing aspects of an illustrative operating environment for grouping products by size and weight, including several software and hardware components provided by embodiments presented herein.

The following detailed description is directed to technologies for grouping products by size and weight in order to avoid having to measure and weigh every product offered for delivery by a merchant. Many products may have substantially the same size and weight based on industry standards for packaging of the products or by convention. For example, a 2-liter bottle of soda from two different vendors may be packaged in the same sized bottle and have substantially the same weight. Similarly, a carton of a dozen eggs from two different suppliers may have the same size and weight as well. Utilizing the embodiments described herein, products having similar size and weight may be grouped together in a group. By grouping products having similar dimensions together, the merchant may choose to only measure one of the products in the group, with the other products "inheriting" the dimensions of the measured product, significantly reducing the number of products that must be measured.

An online retailer may provide a customer-facing user interface that provides a means for a user to browse the products available for delivery or search the products by category, type, keyword, or other criteria. The customer-facing user interface may provide the details of the resulting products, including the type of packaging, and provide a picture or other graphic image of the product as well. The customer-facing user interface may further provide a method for selecting one or more products for inclusion into a virtual shopping cart, such as a drag-and-drop interface, for example. According to embodiments described herein, the customer-facing user interface may be extended to provide a means for inventory personnel or other authorized users to group products of similar size and weight together for use in other areas of the inventory system.

It should be appreciated that the subject matter presented herein may be implemented as computer process, a computer-controlled apparatus, a computing system, or an article of manufacture, such as a computer-readable storage medium. These and various other features will become apparent from a reading of the following disclosure and a review of the associated drawings.

While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced on or in conjunction with other computer system configurations beyond those described below, including multiprocessor systems, microprocessor-based or programmable consumer electronics, minicomputers, mainframe computers, handheld computers, personal digital assistants, cellular telephone devices, special-purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

FIG. 1 and the following description are intended to provide a brief, general description of a suitable computing environment in which the embodiments described herein may be implemented. In particular, FIG. 1 is a system and network diagram that shows an illustrative operating environment 100 including several software components for grouping products by size and weight, according to embodiments provided herein. The environment 100 includes a user 102 that uses a user computer 104 to access a merchant system 120 across a network 108. The user 102 may be a customer that desires to order a number of products for delivery from the merchant, or the user may be inventory personnel responsible for maintaining inventory information regarding the products offered by the merchant. The user computer 104 may be a personal computer ("PC"), a desktop workstation, a laptop, a notebook, a personal digital assistant ("PDA"), an electronic book reader, a game console, a set-top box, a consumer electronics device, a server computer, or any other computing device capable of connecting to the network 108 and communicating with the merchant system 120.

The network 108 may be a local-area network ("LAN"), a wide-area network ("WAN"), the Internet, or any other networking topology known in the art that connects the user computer 104 to the merchant system 120. The merchant system 120 may include a number of application servers 122 that provide various application services to the user computer 104 over the network 108. The user 102 may use a client application program executing on the user computer 104, such as a web browser, to access and utilize the services provided by the application servers 122 across the network 108. Alternatively, the user computer 104 may utilize any number of communication methods known in the art to communicate with the merchant system 120 and/or the application servers 122 across the network 108, including remote procedure calls, SOAP-based web services, remote terminal protocols, proprietary client-server architectures, and the like.

The application servers 122 may execute a number of modules in order to provide the services to the user computer 104. The modules may execute on a single application server 122 or in parallel across multiple application servers in the merchant system 120. In addition, each module may consist of a number of subcomponents executing on different application servers 122 or other computing devices in the merchant system 120. The modules may be implemented as software, hardware, or any combination of the two.

According to embodiments, a customer-facing interface module 124 executes on the application servers 122. The customer-facing interface module 124 provides services to the user computer 104 that allow the user 102 to browse and search products offered for sale by the merchant, as well as select products for delivery. The user 102 may browse and search the products through a customer-facing user interface ("UI") presented by the customer-facing interface module 124 to the user at the user computer 104, as will be described below in regard to FIGS. 4-8. The customer-facing interface module 124 may present the UI to the user 102 by sending a series of web pages to be rendered by a browser application executing on the user computer 104, for example. It will be appreciated that the customer-facing interface module 124 may present the customer-facing UI to the user 102 using any other technology known in the art for serving a user interface to a remote computer.

The customer-facing interface module 124 may retrieve the information regarding the products offered by the merchant from a number of inventory items 126 maintained by the merchant system 120. An inventory item 126 may be a data structure that stores the identity, description, and other parameters of a corresponding product. According to one embodiment, the inventory item 126 also contains weight and dimensional data regarding the corresponding product, as will be described in more detail below in regard to FIG. 2. The inventory items 126 may be stored in a data storage system 128, such as a database server, that is accessible by the application servers 122 and other components of the merchant system 120.

In a further embodiment, a grouping module 130 also executes on the application servers 122. The grouping module 130 works in conjunction with the customer-facing interface module 124 to extend the customer-facing UI presented on the user computer 104 to allow the user 102 to group products of similar size and weight, as will be described below in regard to FIGS. 4-8. The extended UI may only be accessible to those user computers 104 within the merchant system 120 and/or may be presented to a limited number of authorized users, such as inventory personnel of the merchant. Each group of products created by the user 102 may be stored as a product group 132 in the data storage system 128. The product group 132 may be a data structure that stores the identity of a source product for each group, as well as the identities of other products having similar size and weight to the source product, as will be described in more detail below in regard to FIG. 3.

The grouping module 130 may further provide additional services to the user computer that allow the user 102 to manage the product groups 132, such as adding or removing products from a product group; changing the source product of the product group; viewing the dimension data for the source product or other products in the product group; and the like. The user 102 may manage the product groups 132 through a UI presented by the grouping module 130 to the user at the user computer 104, as will be described below in regard to FIGS. 9-11, or through some other method or technology implemented by the grouping module.

Figure 2:
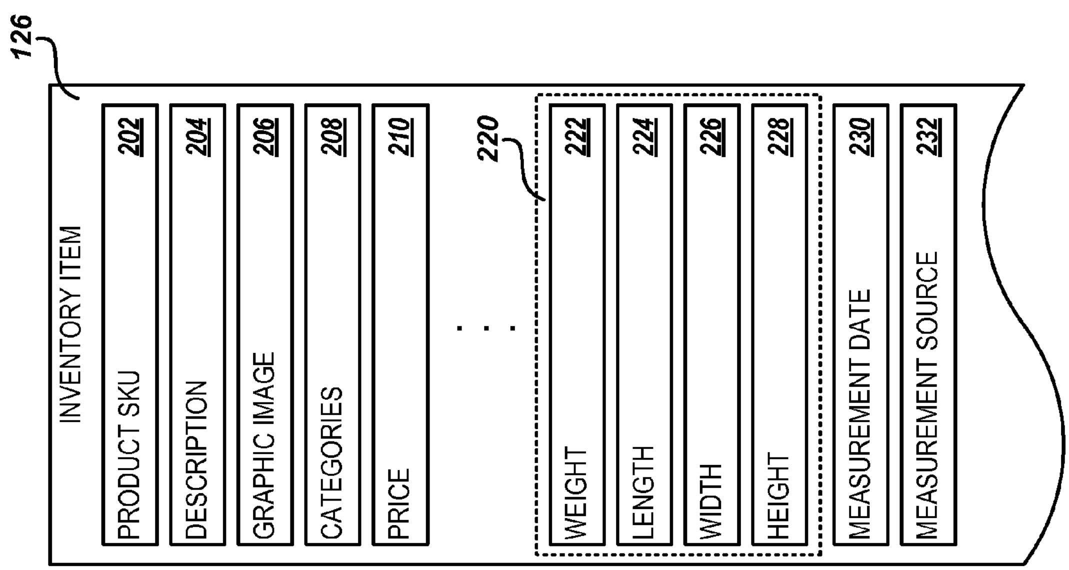
FIG. 2 is a data structure diagram illustrating a number of data elements maintained for a product, according to embodiments presented herein.
Figure 3:
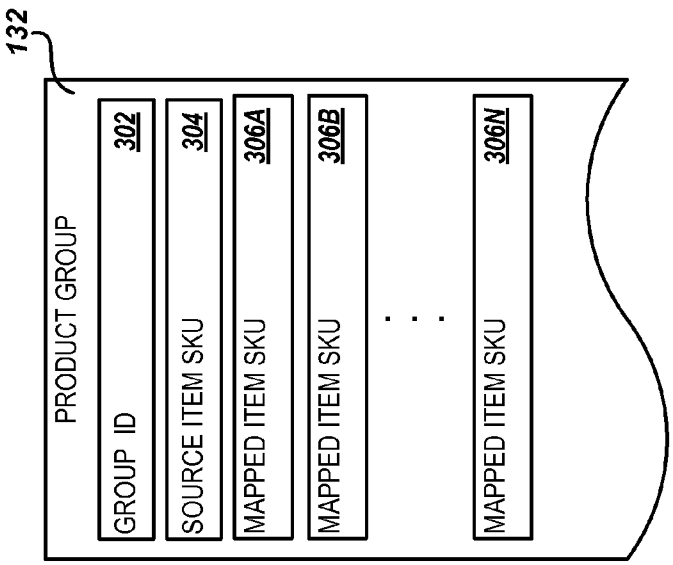
FIG. 3 is a data structure diagram illustrating a number of data elements maintained for a group of products having similar size and weight, according to embodiments presented herein.

FIGS. 2 and 3 are data structure diagrams showing a number of data elements stored in a data structure. It will be appreciated by one skilled in the art that each of the data structures shown in the figures may represent a database table, an object stored in a computer memory, a programmatic structure, or any other data container commonly known in the art. Each data element included in the data structures may represent one or more fields or columns of a database table, one or more attributes of an object, one or more member variables of a programmatic structure, or any other unit of data of a data structure commonly known in the art. The implementation is a matter of choice, and may depend on the technology, performance, and other requirements of the computing system upon which the data structures are implemented.

FIG. 2 shows one example of data elements that may be stored in the inventory item 126, according to embodiments. As described above, the inventory item 126 stores the identity, description, and other parameters for a corresponding product. The inventory item 126 may contain a product stock-keeping unit ("SKU") 202 that uniquely identifies the corresponding product within the merchant system 120. The inventory item 126 may also contain other information regarding the corresponding product that may be presented to the user 102 through the customer-facing UI, such as a product description 204; a graphic image 206 that represents the product; one or more categories 208, types, or other classifiers allowing the products to be categorized for searching and browsing; a price 210 for the product; and the like.

According to embodiments, the inventory item 126 also includes weight and dimensional data 220 for the corresponding product. The weight and dimensional data 220 in the inventory item 126 may be used by the merchant system 120 for the storage, shipping, and handling of the corresponding product. For example, the merchant may use the weight and dimensions of each product in a multiple product order to determine the order in which the products are picked from inventory, the size of the totes needed to move the products to the packing location, the number and size of shipping containers or boxes required to ship the products in the order, and the orientation and manner in which each product will be packed for shipment. The weight and dimensional data 220 may include a weight 222 of the corresponding product, along with a length 224, width 226, and height 228 of the product. It will be appreciated that the weight and dimensional data 220 stored in the inventory item 126 may include additional or alternative elements beyond the weight 222, length 224, width 226, and height 228 described herein, including, but not limited to, shape and volume of the corresponding product.

The inventory item 126 may also contain a measurement date 230 indicating when the weight and dimensional data 220 was last determined for the corresponding product, and a measurement source 232 indicating how the weight and dimensional data was obtained. For example, a product may be measured automatically by a dimensional scanner, such as a CUBISCAN® cubing and weighing system from QUANTRONIX, Inc. of Farmington, Utah. Alternatively, the product may be measured and weighed manually by inventory personnel. According to embodiments, not every product having a corresponding inventory item 126 in the data storage system 128 may have been measured. The lack of weight and dimensional data 220 for a product may be indicated by storing zero values in the weight 222, length 224, width 226, and/or height 228 of the corresponding inventory item 126, or by storing a null-date value in the measurement date 230, for example. It will be further appreciated that the inventory item 126 may contain additional data elements beyond those shown in FIG. 2 and described above that may be utilized by the customer-facing interface module 124 and/or other modules of the merchant system 120.

FIG. 3 shows one example of data elements that may be stored in a product group 132 created by the grouping module 130, according to embodiments. As described above, the product group 132 stores the identity of a source product for each group, as well as the identities of other products having similar size and weight to the source product. The product group 132 may contain a group ID 302 that identifies the group to the grouping module 130 and/or other modules of the merchant system 120. The product group 132 may also contain a source item SKU 304 that uniquely identifies the source product for the product group. The product group 132 also contains a number of mapped item SKUs 306A-306N (referred to herein generally as mapped item SKU 306) that uniquely identify other products having similar size and weight as the source product.

According to one embodiment, the inventory item 126 for the source product is used to provide weight and dimensional data 220 for all other products in the product group 132. In other words, the products identified by the mapped item SKUs 306A-306N in a product group 132 "inherit" the weight and dimensional data 220 of the product identified by the source item SKU 304. In another embodiment, no source item SKU 304 is specified in the product group 132, and the products identified by the mapped item SKUs 306A-306N in the product group inherit the weight and dimensional data 220 of the product in the group having the most up-to-date weight and dimensional data 220, i.e. the most recent measurement date 230 in the corresponding inventory item 126.

It will be appreciated that other methods may be utilized to determine a source product for weight and dimensional data 220 for all the products identified in the product group 132 beyond the explicit source item SKU 304 or most recent measurement date 230 described herein, and it is intended that this application include all such methods of determining the source product for the product group. In a further embodiment, the weight and dimensional data 220 of the source product is only utilized for products identified by the mapped item SKUs 306A-306N in the product group 132 having no specified weight and dimensional data 220 in the corresponding inventory item 126. It will be further appreciated that the product group 132 may contain additional data elements beyond those shown in FIG. 3 and described above that are utilized by the grouping module 130 and/or other modules of the merchant system 120.

Figure 4:
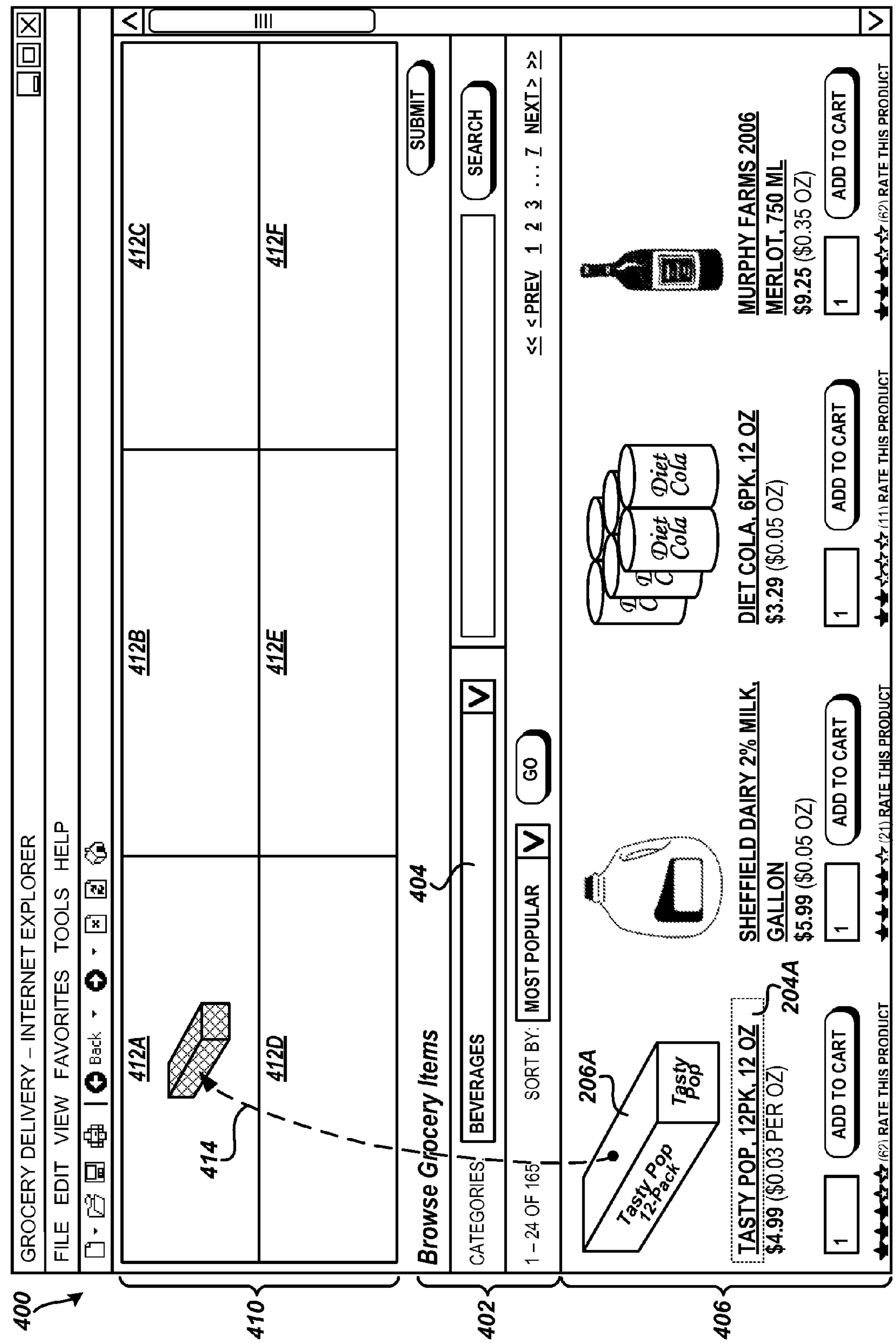
FIGS. 4-8 are display diagrams showing an illustrative user interface for grouping products by size and weight, according to embodiments presented herein.

FIG. 4 shows an extended UI 400 for grouping products by size and weight. According to one embodiment, the extended UI 400 may include elements from the customer-facing UI that allow the user 102 to search and browse the products offered by the merchant for delivery, as well as additional UI components facilitating the grouping of products into product groups 132. As described above in regard to FIG. 1, the grouping module 130 may work in conjunction with the customer-facing interface module 124 to present the extended UI 400 to the user 102 by sending a series of web pages to the user computer 104 to be rendered by a browser application executing on the user computer, for example. As further described above, the extended UI 400 may only be accessible to those user computers 104 within the merchant system 120 and/or may be presented to a limited number of authorized users 102, such as inventory personnel of the merchant.

As shown in FIG. 4, the extended UI 400 may include browsing and searching UI components 402, such as the category drop-down UI control 404, provided as part of the customer-facing UI that allows the user 102 to browse and/or search through the available products. Any number of browsing and searching methods known in the art may be facilitated through the browsing and searching UI components 402, such as selecting products by category or sub-category; searching for products by keyword, SKU, and/or other criteria; and the like. The extended UI 400 may further include a resulting product list 406 that includes those products matching any specified browse and/or search criteria. The resulting product list 406 may include the product description 204A and graphic image 206A from the inventory item 126 corresponding to each product in the list. Further, the browsing and searching UI components 402 may provide UI controls for sorting and navigating through the resulting product list 406. It will be appreciated that the UI components described above may be presented to the user 102 in addition to other UI controls and components displayed at the user computer 104.

According to embodiments, the extended UI 400 also includes grouping UI components 410 added to the customer-facing UI that facilitate the grouping of products by size and weight. The grouping UI components 410 may be displayed in a reserved space in a window containing the customer-facing UI, or may partially overly the customer-facing UI elements displayed within the window. In another embodiment, the grouping UI components 410 may be displayed in a separate window in conjunction with the display of the customer-facing UI.

In one embodiment, the grouping UI components 410 include a number of group boxes 412A-412F (referred to herein generally as group box 412) displayed in a grid across the top of the window containing the customer-facing UI, as shown in FIG. 4. It will be appreciated that any number of group boxes 412 may initially be displayed, and that the group boxes may be displayed at any initial size beyond that shown in the figures and described herein. The group boxes 412 facilitate the grouping of products by allowing the user 102 to drag-and-drop two or more products having similar size and weight from the resulting product list 406 into the same group box. For example, the user 102 may utilize a drag-and-drop mechanism provided by the browser application executing on the user computer 104 to drag the graphic image 206A of a product in the resulting product list 406 to a first group box 412A, as shown by arrow 414 in FIG. 4. The drag-and-drop mechanism may be facilitated by the customer-facing UI as part of a virtual shopping cart mechanism, for example, or the drag-and-drop mechanism may be a component of the extended UI 400 delivered to the user computer 104 by the grouping module 130.

Figure 5:
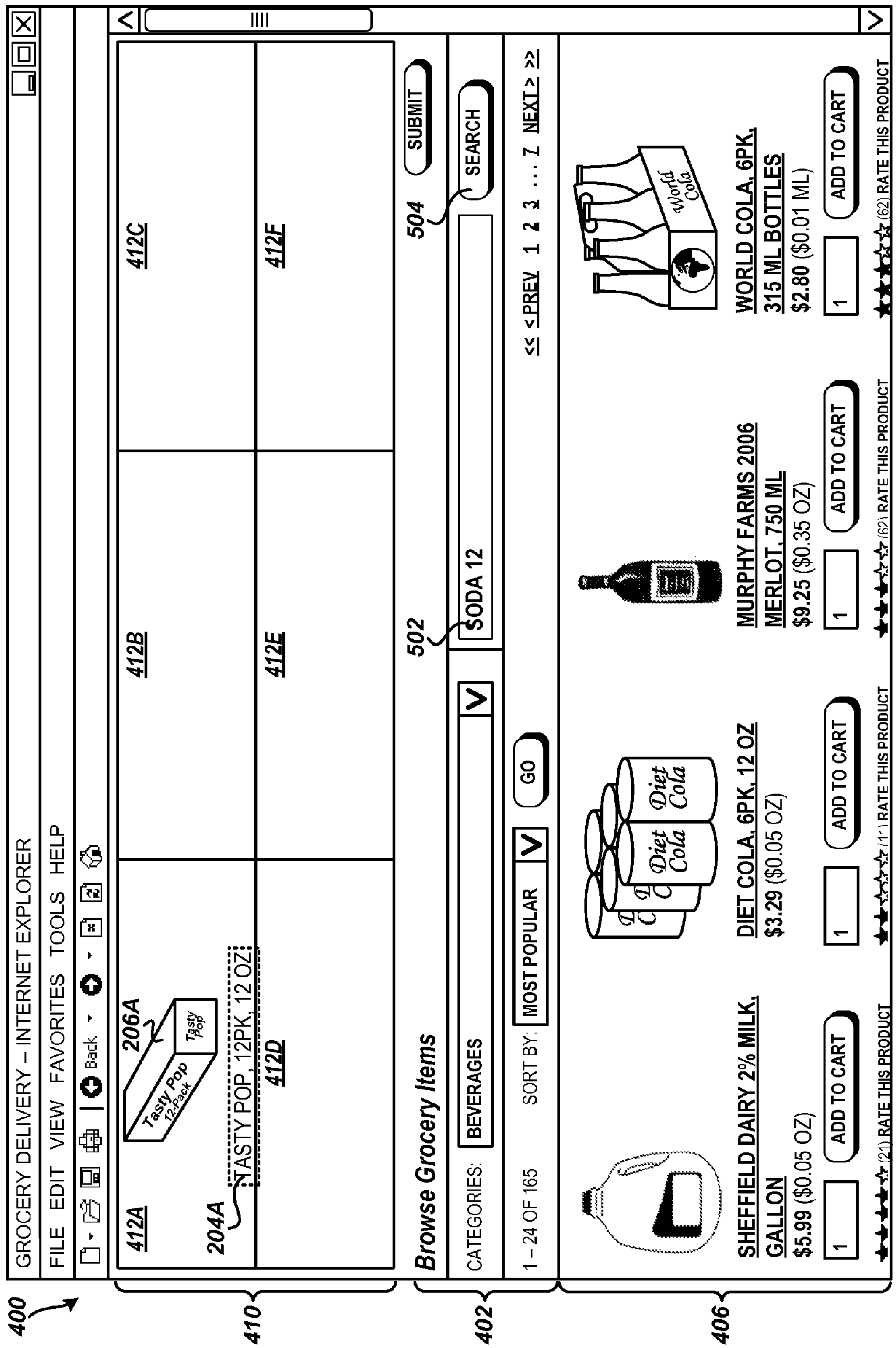

When the user 102 drops the dragged graphic image 206A into the first group box 412A, the group box is labeled with the product description 204A for the corresponding product from the resulting product list 406 and the graphic image for the product is placed in the group box, as shown in FIG. 5. This first product dragged to the group box 412A becomes the "reference product" for that group box. In addition, the reference product may be removed from the resulting product list 406, as further shown in the figure. After dragging the reference product into the first group box 412A, the user 102 may then utilize the browsing and searching UI components 402 to find additional products having similar size and weight to the reference product. For example, the user may utilize search UI controls 502, 504 of the browsing and searching UI components 402 to search for specific items likely to have similar sized packaging and similar weight to the reference product. Such a search operation may result in a resulting product list 406 such as that shown in FIG. 6.

Figure 6:
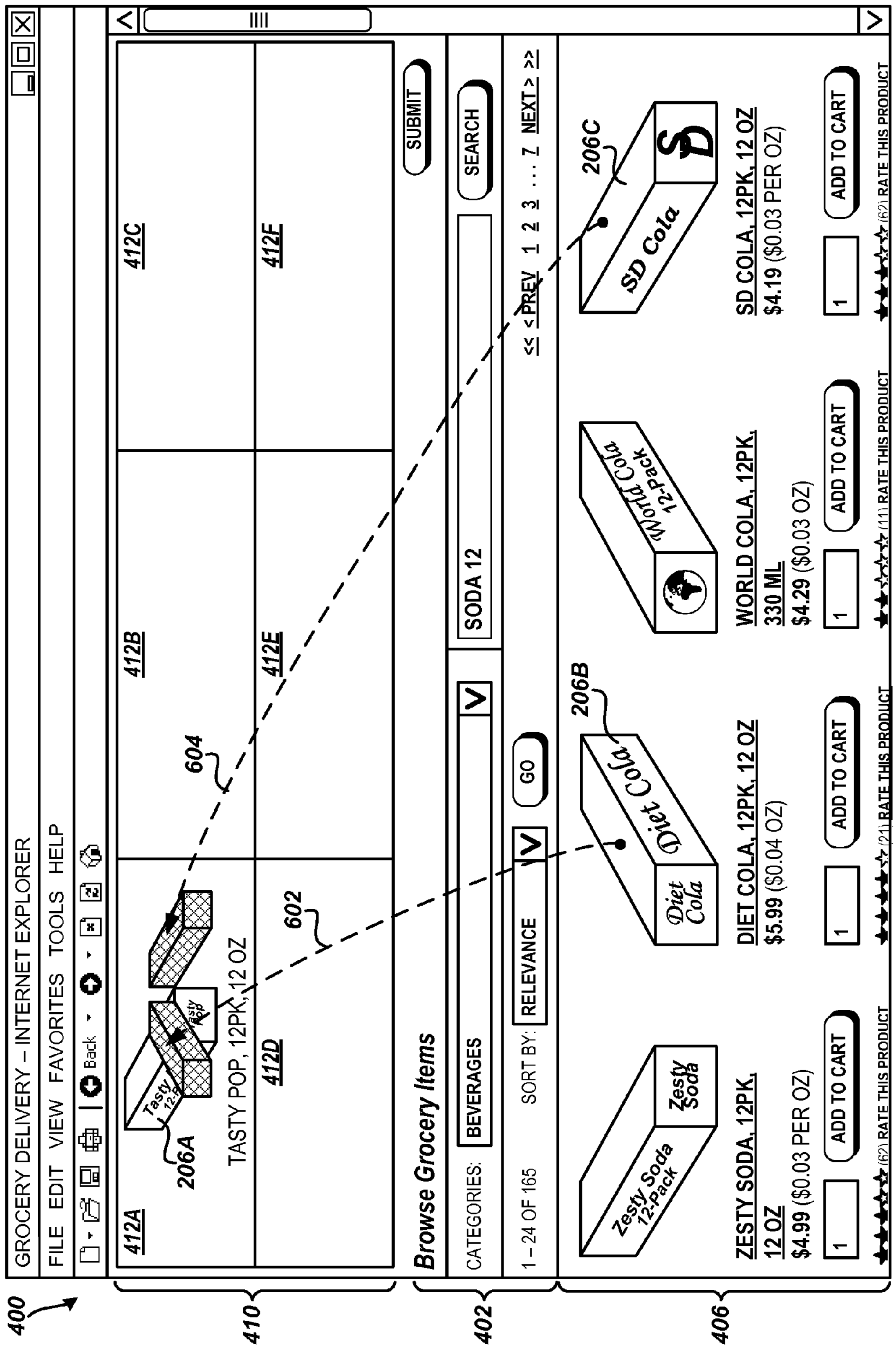

The user 102 may then drag the graphic images 206B, 206C corresponding to products in the resulting product list 406 known to have similar size and weight to the reference product from the resulting product list 406 into the group box 412A, as indicated by arrows 602 and 604 shown in FIG. 6. By dragging the graphic images 206B, 206C into the group box 412A, the user 102 designates the corresponding products as having similar size and weight to the reference product. In one embodiment, the graphic images 206B, 206C will be displayed in the group box along with the graphic image 206A of the reference product. In another embodiment, the label for the group box 412A may be modified to contain a count of the number of products grouped together with the reference product.

Figure 7:
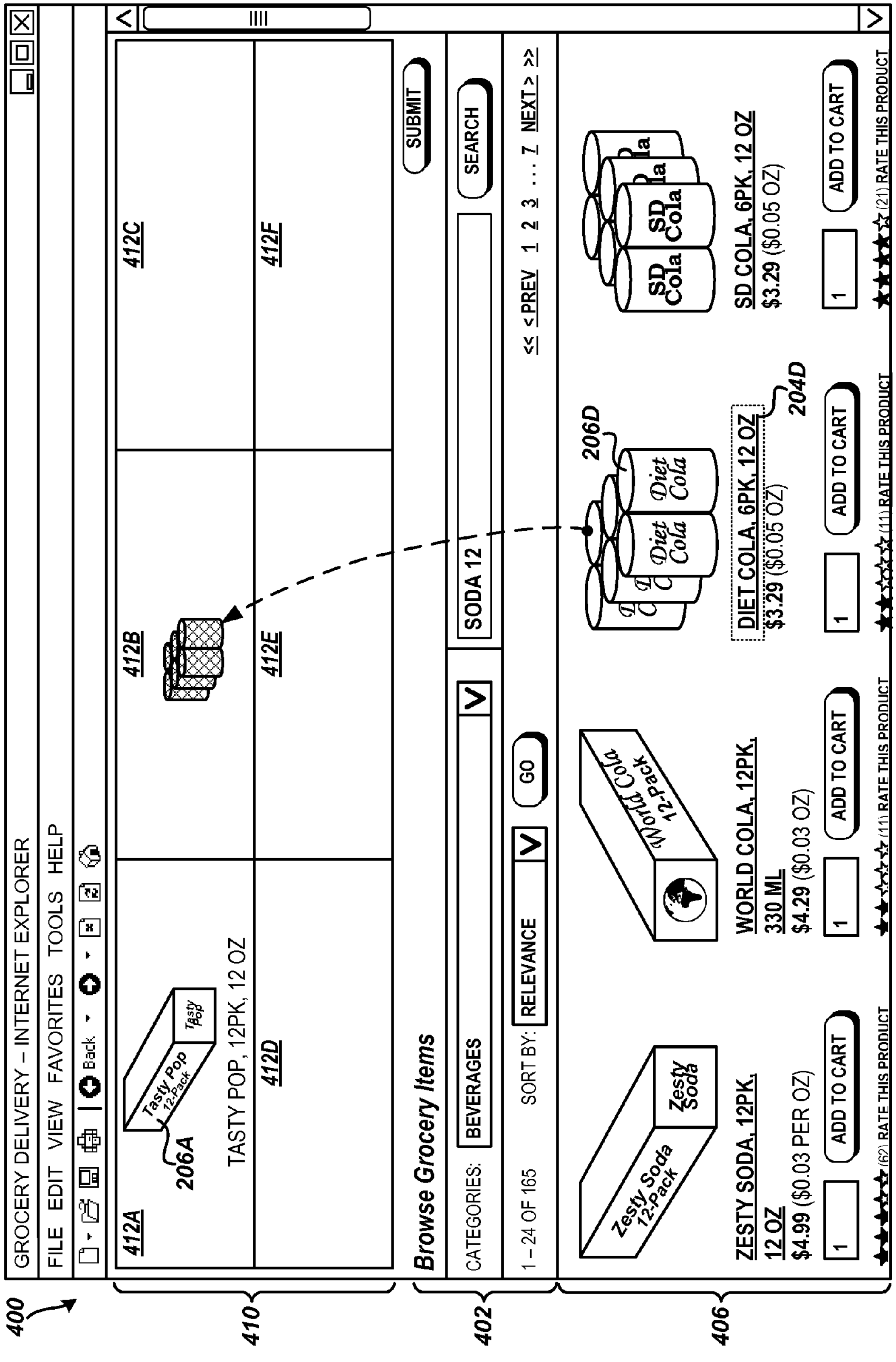

In addition, the products corresponding to the dragged graphic images 206B, 206C may be removed from the resulting product list 406, as shown in FIG. 7. The user 102 may also drag the graphic image 206D corresponding to a product having a different size and/or weight from the reference product established for group box 412A into a second group box 412B, as indicated by arrow 702 in FIG. 7. The dragged graphic image 206D will be displayed in the second group 412B box and the second group box will be labeled with the product description 204D of the corresponding product, establishing that product as the reference product for the second group box 412B, as shown in FIG. 8.

The user 102 may continue to utilize the extended UI 400 to identify products having similar size and weight to the reference products established for group boxes 412A and 412B, and to group these products with the corresponding reference products using the drag-and-drop mechanism described above, as indicated by arrows 802 and 804 of FIG. 8. In addition, the user may identify products having different sizes and/or weights from the reference products of the established group boxes 412A, 412B, and drag the graphic images 206G corresponding to these products to new group boxes 412C-412F, as indicated by arrow 806 in FIG. 8. It will be appreciated that the user 102 may utilize the drag-and-drop mechanism of the extended UI 400, in conjunction with one or more browse and search operations through the UI elements of the customer-facing UI, to drag graphic images 206A-206G corresponding to any number of products from the resulting product list 406 into the one or more group boxes 412.

It will be further appreciated that the resulting product list 406 generated by a browse or search operation utilizing the browsing and searching UI components 402 may be sorted differently from the conventional sort order of the customer-facing UI in order to facilitate the grouping of products by size and weight. For example, the products in the resulting product list 406 may be sorted by a component of the product description 204 or another element from the corresponding inventory item 126 that may indicate the size, weight, count, or other dimensional aspect of the product. In this way, products likely to have similar size and weight may appear together in the resulting product list 406. In addition, as subsequent browse and search operations are executed utilizing the UI elements of the customer-facing UI, those products already contained in one of the group boxes 412 or in a product group 132 may be excluded from the resulting product list 406. This may facilitate easier identification of products having similar size and weight that have not already been included in a group.

Figure 8:
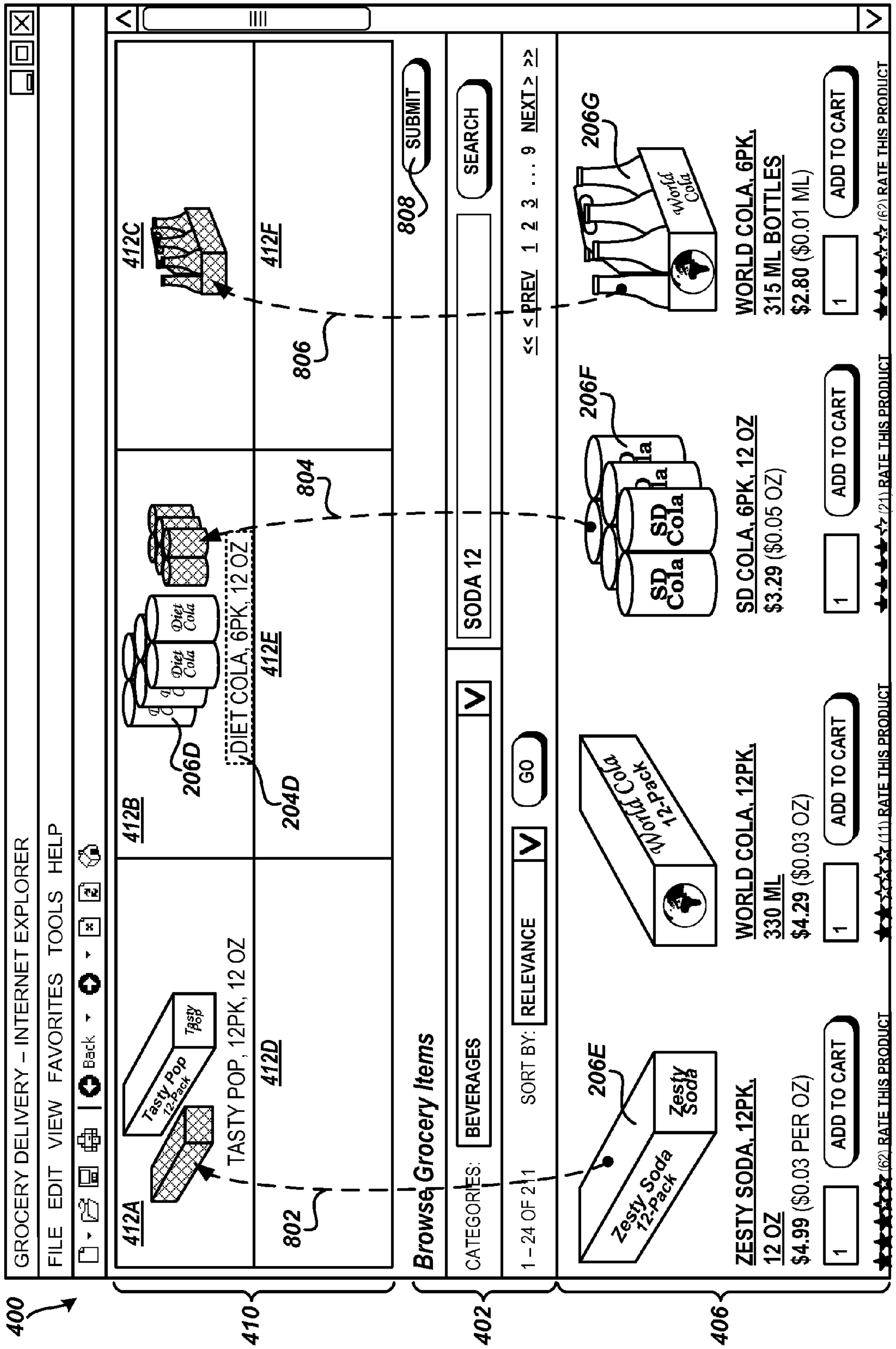

Once the user 102 has grouped the desired products having similar size and weight into one or more of the group boxes 412, the user may select a UI control included in the grouping UI components 410, such as the submit pushbutton UI control 808 shown in FIG. 8, to indicate to the grouping module 130 that the grouping of products by size and weight is complete. The grouping module 130 may then create product groups 132 in the data storage system 128 corresponding to each group box 412 containing one or more products. In one embodiment, the SKU of the reference product for a group box 412 will be stored in the source item SKU 304 of the corresponding product group 132. The SKUs of the remaining products in the group box 412 will be stored in the mapped item SKUs 306 of the product group 132. In another embodiment, the SKUs of all the products in the group box 412 are stored as mapped item SKUs 306 in the corresponding product group 132, and the source product for the group is then determined by the grouping module 130, as will be described in more detail below in regard to FIG. 12.

The extended UI 400 may include other UI components or mechanisms that facilitate the grouping of products by size and weight beyond the group boxes 412 described above and shown in the figures. For example, the extended UI 400 may allow the user 102 to drag the graphic image 206A-206G corresponding to a first product in the resulting product list 406 onto the graphic image of a second product having a similar size and weight. This action may cause the grouping module 130 to add a new product group 132 to the data storage system 128 having the SKU of the second product as the source item SKU 304 and the SKU of the first product as a mapped item SKU 306. If the second product already exists in a product group 132, the grouping module 130 may merely add the SKU of the first product as a mapped item SKU 306 in that product group. In addition, the extended UI 400 may display a text or graphic indicator in proximity to some products in the resulting product list 406 indicating products already grouped within a product group 132; products that are identified as source items in a product group; products that have weight and dimensional data 220 in the corresponding inventory item 126; the number of other products grouped with the product in a product group; and the like. It is intended that this application include all such methods of extending a customer-facing UI to facilitate the grouping of products by size and weight.

Figure 9:
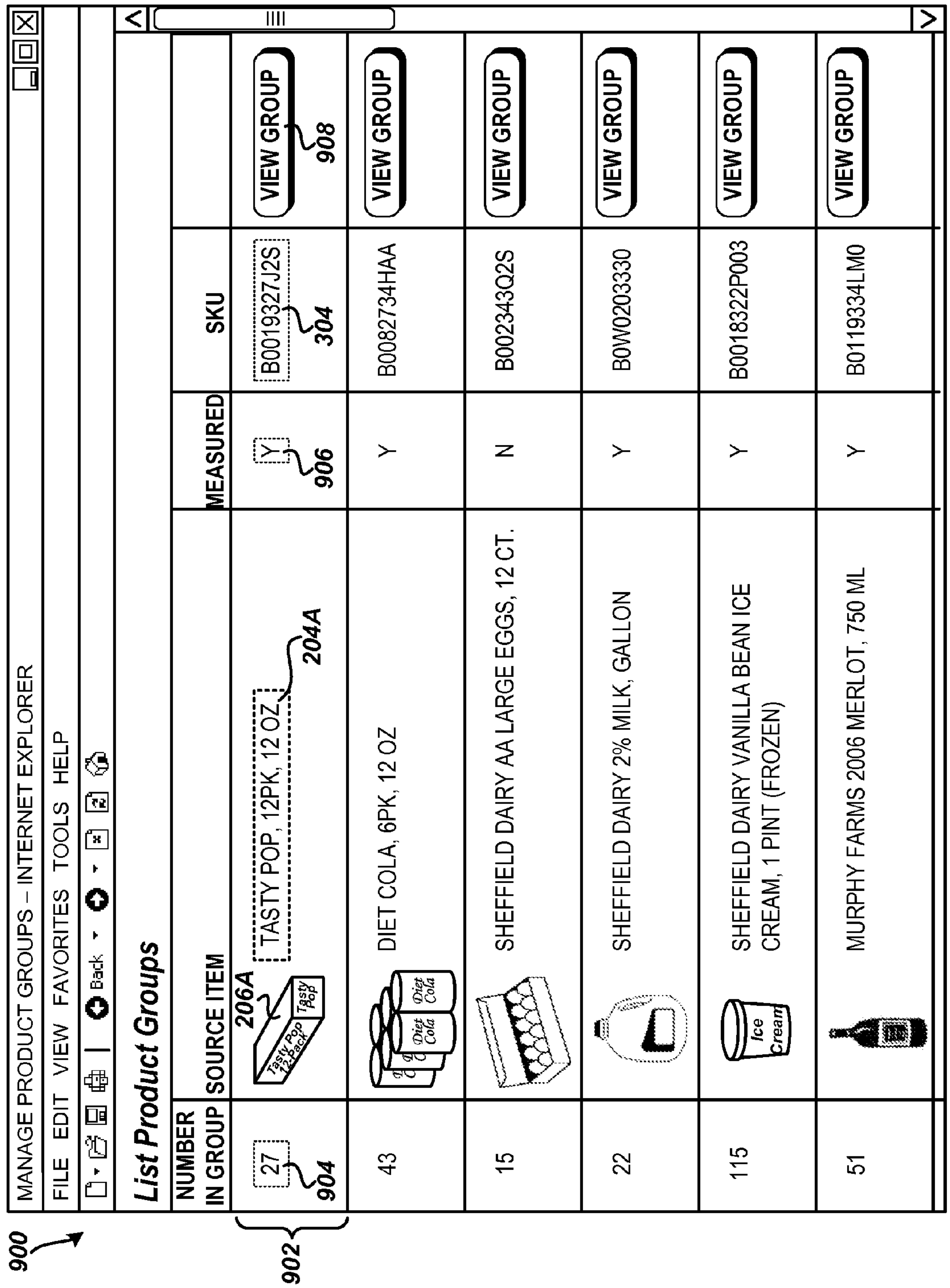
FIGS. 9-11 are display diagrams showing illustrative user interfaces for managing the groups of products having similar size and weight, according to embodiments presented herein.
Figure 10:
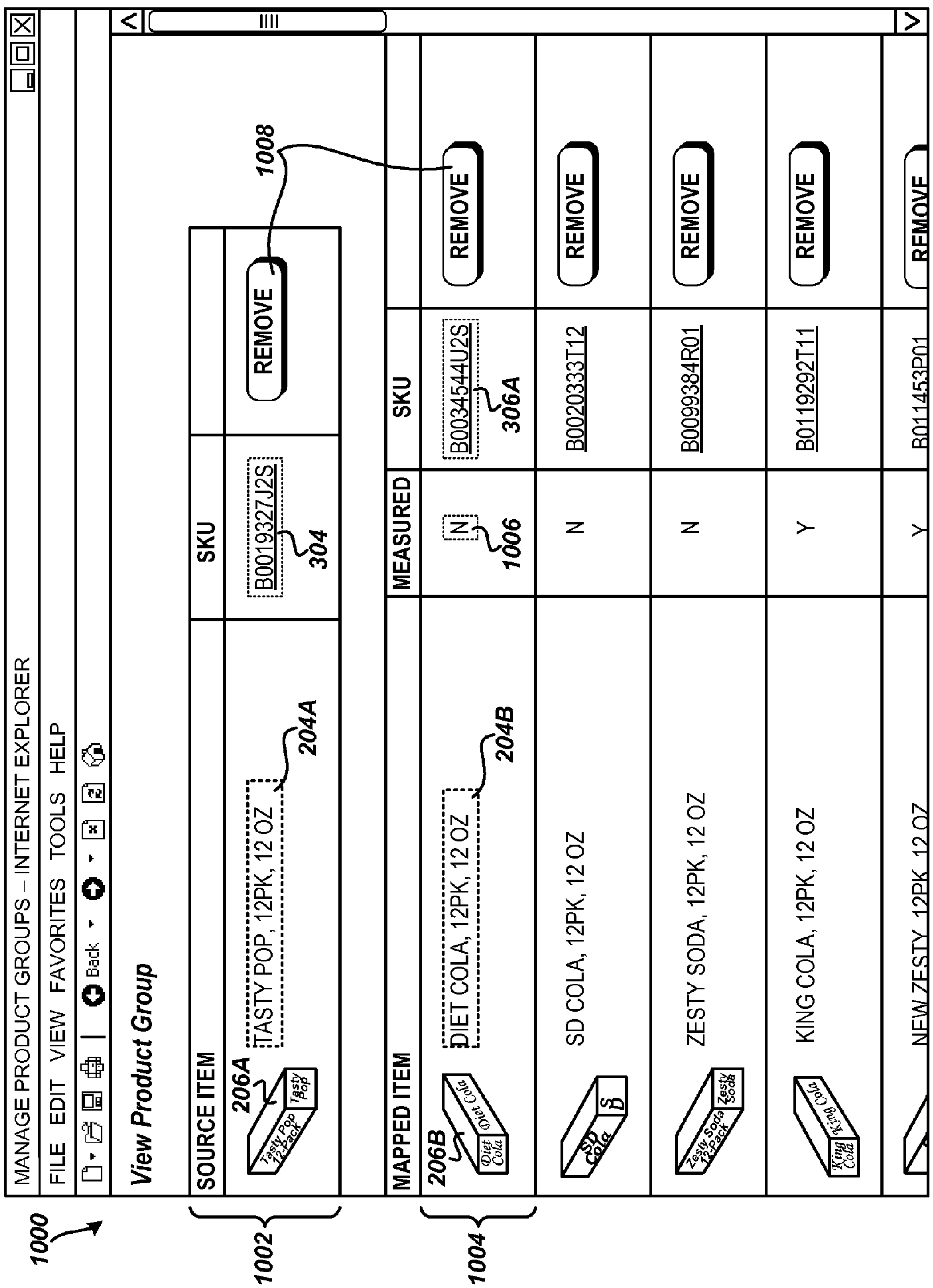
Figure 11:
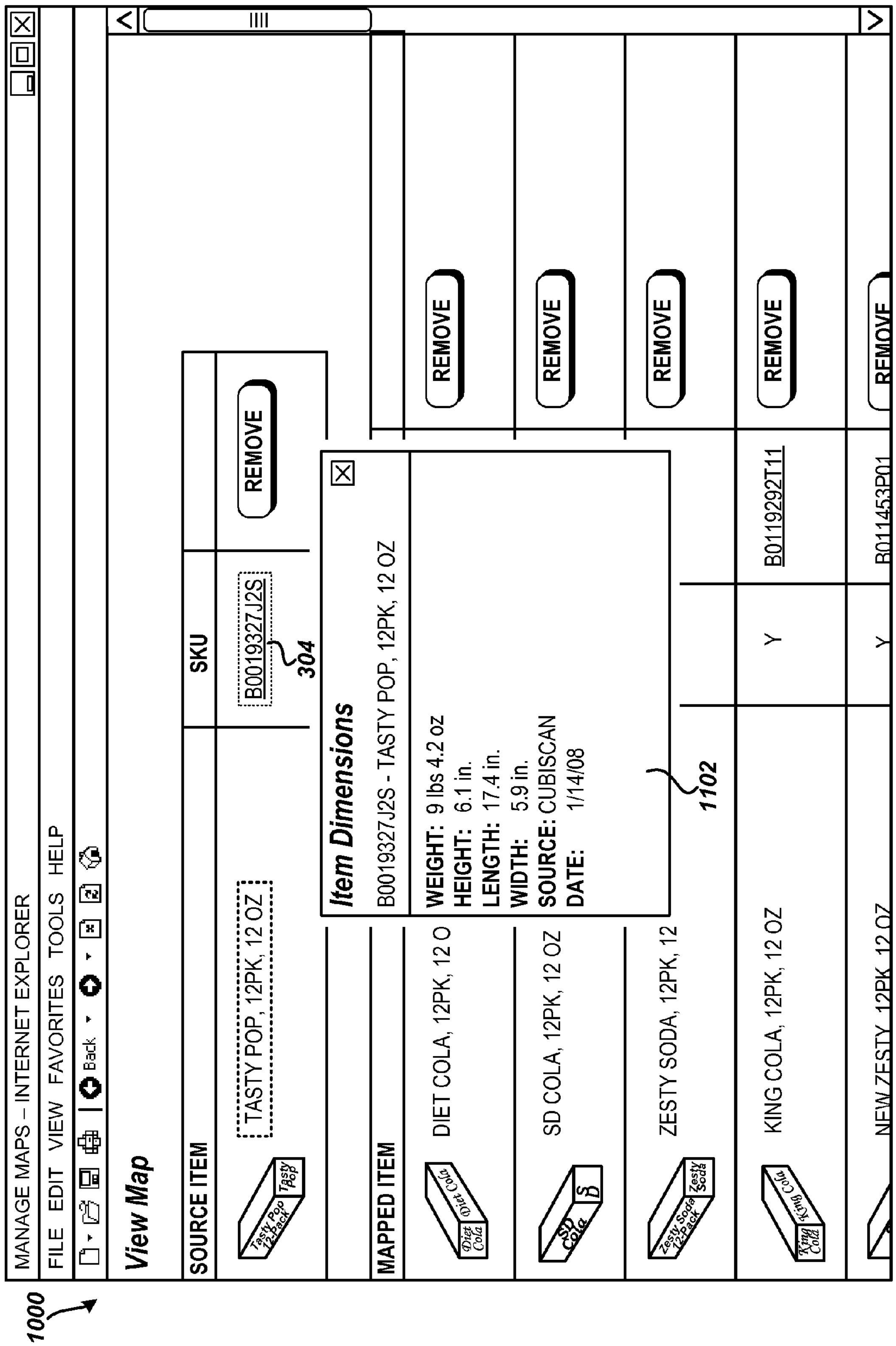

FIGS. 9-11 show illustrative user interfaces 900 and 1000 for managing the product groups 132 created by the grouping module 130, according to one embodiment. As described above in regard to FIG. 1, the grouping module 130 may present the user interfaces 900, 1000 to the user 102 to allow the user perform such management activities as adding or removing products from a product group 132; changing the source product of a product group; viewing the weight and dimensional data 220 for a product in a product group; and the like. The grouping module 130 may present the user interfaces 900, 1000 to the user 102 by sending a series of web pages to the user computer 104 to be rendered by a browser application executing on the user computer, for example.

As shown in FIG. 9, the user interface 900 may include a list of product groups comprising a product group row 902 corresponding to each product group 132 in the data storage system 128. Each product group row 902 may include a product count 904 indicating the number of the products identified in the corresponding product group 132, the graphic image 206A and product description 204A of the source product, an indicator 906 indicating whether the inventory item 126 corresponding to the source product contains weight and dimensional data 220, and the source item SKU 304 of the product group. In addition, each product group row 902 may include a UI control, such as the view pushbutton UI control 908 shown in FIG. 9, that allows the user 102 to view details regarding the corresponding product group 132.

If the user 102 selects the view pushbutton UI control 908, the grouping module 130 causes the user interface 1000 shown in FIG. 10 to be displayed, providing additional details regarding the corresponding product group 132. The user interface 1000 may include source item details 1002, including the graphic image 206A and product description 204A from the inventory item 126 corresponding to the source item SKU 304 of the product group 132 along with the source item SKU. The user interface 1000 may further include a list of mapped items comprising a mapped item row 1004 for each mapped item SKU 306 in the product group 132. The mapped item row 1004 may include the graphic image 206A and product description 204A from the inventory item 126 corresponding to the mapped item SKU 306, an indicator 1006 indicating whether the inventory item 126 corresponding to the mapped item SKU 306 contains weight and dimensional data 220, and the mapped item SKU.

In addition, the source item details 1002 and/or each mapped item row 1004 may include a UI control, such as the remove pushbutton UI control 1008 shown in FIG. 10, that allows the user 102 to remove the corresponding product from the product group 132. It will be appreciated that if the source product corresponding to the source item SKU 304 is removed from the product group 132, another product in the group may be designated as the source product. In one embodiment, the grouping module 130 may determine the source product by selecting the product within the product group 132 having the most recent measurement date 230 from the corresponding inventory item 126. In another embodiment, the user interface 1000 may include a means for the user 102 to select the new source product.

The user interface 1000 may further include a UI control, such as a hyperlink incorporated in the display of the source item SKU 304 and/or the mapped item SKUs 306, that allows the user to view the weight and dimensional data 220 for the corresponding product. For example, if the user 102 selects the source item SKU 304 in the source item details 1002, the grouping module 130 causes an item dimensions panel 1102 to be displayed to the user, providing the weight and dimensional data 220 from the inventory item 126 corresponding to the source product. The item dimensions panel 1102 may include the weight 222, length 224, width 226, and height 228 from the inventory item 126, along with the measurement source 232 and measurement date 230 for the weight and dimensional data 220.

It will be appreciated that the UI controls and components shown in the accompanying drawings are provided as example implementations only, and that other UI controls and components known in the art may be utilized in the user interfaces 400, 900, and 1000 to provide the functionality described above. The implementation is a matter of choice, and may depend on the technology utilized by the customer-facing interface module 124 and/or the grouping module 130 to present the user interfaces 400, 900, and 100 to the user 102, the type of the user computer 104 on which the user interfaces are rendered, and other factors. It will be further appreciated that the user interfaces 400, 900, and 1000 shown in the figures may appear differently on different types of user computers 104.

Figure 12:
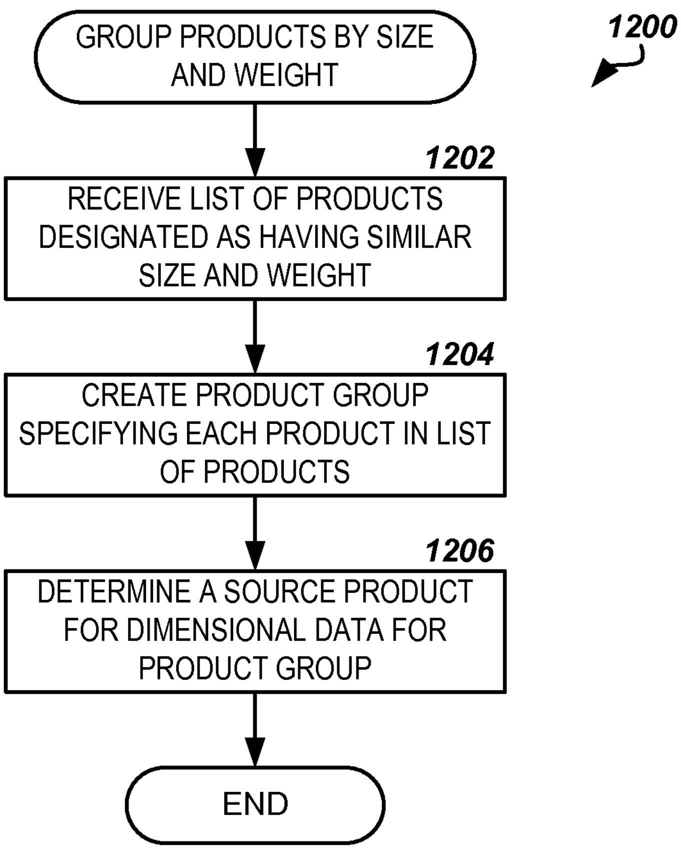
FIG. 12 is a flow diagram showing a method for grouping products by size and weight, according to embodiments described herein.
Figure 13:
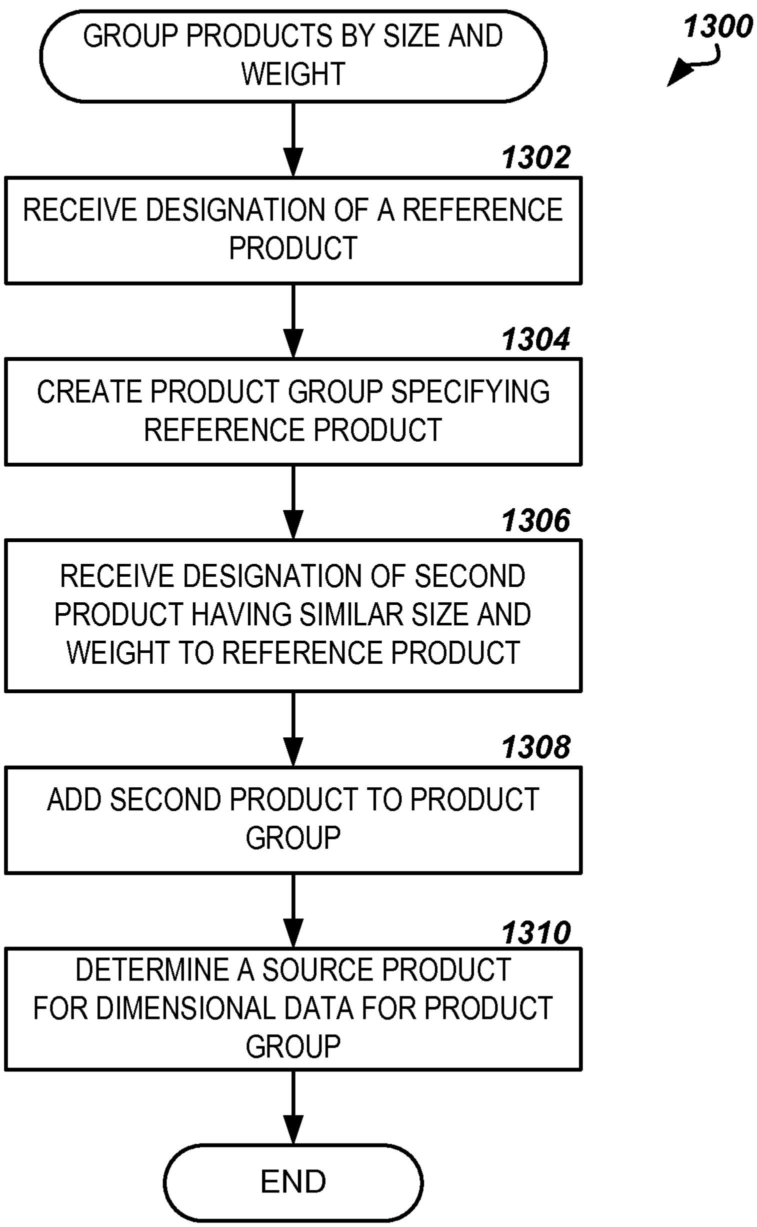
FIG. 13 is a flow diagram showing another method for grouping products by size and weight, according to embodiments described herein.

Turning now to FIGS. 12 and 13, additional details will be provided regarding the embodiments presented herein for grouping products by size and weight. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

FIG. 12 illustrates a routine 1200 for grouping products by size and weight, according to embodiments described herein. In one embodiment, the routine 1200 is performed by the grouping module 130. It will be appreciated that the routine 1200 may also be performed by another module or component of the merchant system 120, or by a combination of modules and components.

The routine 1200 begins at operation 1202, where the grouping module 130 receives a list of products designated as having similar size and weight. In one embodiment, the grouping module 130 receives the list of products from the user 102 through a user interface, such as the extended UI 400 described above in regard to FIGS. 4-8, presented to the user at the user computer 104. In another embodiment, the grouping module 130 may generate the list of products programmatically. For example, the grouping module 130 may scan the inventory items 126 corresponding to the products offered by the merchant to determine products of similar size and weight based on a component of the product descriptions 204 or another element from the inventory items that may indicate the size, weight, count, or other dimensional aspect of the product. It will be appreciated that the grouping module 130 may receive the list of products designated as having similar size and weight from sources other than those described herein.

The extent to which products must be similar in size and weight to be included in the list of products may depend upon the requirements of the merchant and the nature of the products being offered. As described above, many products may have substantially the same size and weight based on industry standards for packaging of the products or by convention. For example, a 2-liter bottle of soda from two different vendors may be packaged in the same sized bottle and have substantially the same weight. Similarly, a gallon of milk from two different suppliers may have the same size and weight as well. For such products, only those having substantially the same size and weight may be included in the list of products designated as having similar size and weight.

From operation 1202, the routine 1200 proceeds to operation 1204, where the grouping module 130 creates a product group 132 in the data storage system 128 for the list of products designated as having similar size and weight. The grouping module 130 may generate the unique group ID 302 for the product group 132 to be used to identify the product group to the grouping module 130 and/or other modules of the merchant system 120. Further, the grouping module 130 may store a mapped item SKU 306 in the product group 132 corresponding to each product in the list of products.

The routine 1200 proceeds from operation 1204 to operation 1206, where the grouping module 130 selects one product from the list of products to serve as a source of weight and dimensional data 220 for the remainder of products in the product group 132. In one embodiment, the source product may be designated by the user 102 through the user interface, such as the specification of a reference product for a group box 412 by the user through the extended UI described above in regards to FIGS. 4-8. In another embodiment, the grouping module 130 may determine the source product programmatically. For example, the grouping module 130 may determine the source product by selecting the product within the product group 132 having the most recent measurement date 230 from the corresponding inventory item 126. It will be appreciated that the grouping module 130 may utilize other methods of determining the source product from the list of products than those described herein. Once the source product is selected, the grouping module 130 stores the SKU of the source product in the source item SKU 304 of the product group 132. From operation 1206, the routine 1200 ends.

FIG. 13 illustrates another routine 1300 for grouping products by size and weight, according to further embodiments. In one embodiment, the routine 1300 is performed by the grouping module 130. It will be appreciated that the routine 1300 may also be performed by another module or component of the merchant system 120, or by a combination of modules and components.

The routine 1300 begins at operation 1302, where the grouping module 130 receives a designation of a reference product having a particular size and weight. In one embodiment, the grouping module 130 receives the designation of the reference product from the user 102 through a user interface, such as the extended UI 400 described above in regard to FIGS. 4-8. For example, the user 102 may drag a graphic image 206A representing the reference product from the resulting product list 406 in the extended UI 400 to an empty group box 412A, as shown by arrow 414 in FIG. 4. It will be appreciated that the grouping module 130 may receive the designation of the reference product from sources other than those described herein. The routine 1300 then proceeds to operation 1304, where the grouping module 130 creates a new product group 132 in the data storage system 128 specifying the reference product as a member of the group. The reference product may be specified as a member of the newly created product group 132 by adding the SKU of the reference product as a mapped item SKU 306 or as the source item SKU 304.

The routine 1300 proceeds from operation 1304 to operation 1306, where the grouping module 130 receives a designation of a second product having a similar size and weight to the reference product. As described above in regard to operation 1302, the grouping module 130 may receive the designation of the second product from the user 102 through the extended UI 400. For example, the user 102 may drag the graphic image 206B corresponding to the second product from the resulting product list 406 into the group box 412A designated for the reference product, as indicated by arrow 602 shown in FIG. 6. It will be appreciated that the grouping module 130 may receive the designation of the second product having a similar size and weight to the reference product from sources other than those described herein. The routine 1300 then proceeds to operation 1308, where the grouping module 130 adds the second product to the product group 132 created in operation 1304 by adding the SKU of the second product as a mapped item SKU 306.

From operation 1308, the routine 1300 proceeds to operation 1310, where the grouping module 130 selects one product from the product group 132 to serve as a source of weight and dimensional data 220 for the remainder of products in the group. In one embodiment, the source product may be the reference product specified in operation 1302. In another embodiment, the grouping module 130 may determine the source product programmatically, as described above in regard to operation 1206. It will be appreciated that the grouping module 130 may utilize other methods of determining the source product for the product group 132 than those described herein. Once the source product is selected, the grouping module 130 stores the SKU of the source product in the source item SKU 304 of the product group 132. From operation 1310, the routine 1300 ends.

Figure 14:
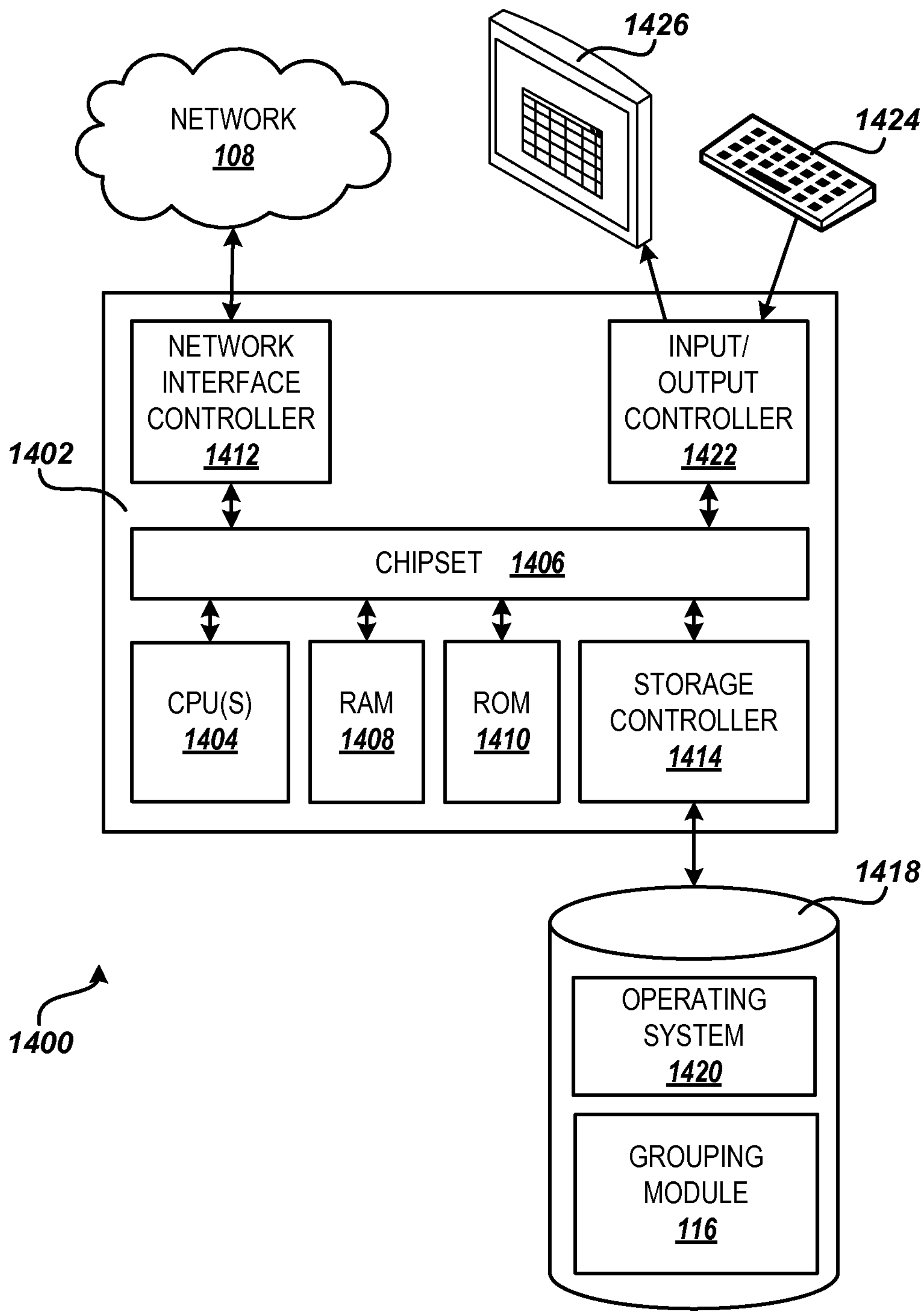
FIG. 14 is a computer architecture diagram showing an illustrative computer hardware architecture for computing devices described in embodiments presented herein.

FIG. 14 shows an example computer architecture 1400 for a computer 1402 capable of executing the software components described herein for grouping products by size and weight, in the manner presented above. The computer architecture 1400 shown in FIG. 14 illustrates a conventional server computer, workstation, desktop computer, laptop, network appliance, personal digital assistant ("PDA"), electronic book reader, digital cellular phone, or other computing device, and may be utilized to execute any aspects of the software components presented herein described as executing on the application servers 122, the user computer 104, or other computing platform.

The computer 1402 includes a baseboard, or "motherboard," which is a printed circuit board to which a multitude of components or devices may be connected by way of a system bus or other electrical communication paths. In one illustrative embodiment, one or more central processing units ("CPUs") 1404 operate in conjunction with a chipset 1406. The CPUs 1404 are standard programmable processors that perform arithmetic and logical operations necessary for the operation of the computer 1402.

The CPUs 1404 perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 1406 provides an interface between the CPUs 1404 and the remainder of the components and devices on the baseboard. The chipset 1406 may provide an interface to a random access memory ("RAM") 1408, used as the main memory in the computer 1402. The chipset 1406 may further provide an interface to a computer-readable storage medium such as a read-only memory ("ROM") 1410 or non-volatile RAM ("NVRAM") for storing basic routines that that help to startup the computer 1402 and to transfer information between the various components and devices. The ROM 1410 or NVRAM may also store other software components necessary for the operation of the computer 1402 in accordance with the embodiments described herein.

According to various embodiments, the computer 1402 may operate in a networked environment using logical connections to remote computing devices and computer systems through the network 108. The chipset 1406 includes functionality for providing network connectivity through a network interface controller ("NIC") 1412, such as a gigabit Ethernet adapter. The NIC 1412 is capable of connecting the computer 1402 to other computing devices over the network 108, such as the user computer 104, the data storage system 128, other application servers 122, and the like. It should be appreciated that any number of NICs 1412 may be present in the computer 1402, connecting the computer to other types of networks and remote computer systems.

The computer 1402 may be connected to a mass storage device 1418 that provides non-volatile storage for the computer. The mass storage device 1418 may store system programs, application programs, other program modules, and data, which are described in greater detail herein. The mass storage device 1418 may be connected to the computer 1402 through a storage controller 1414 connected to the chipset 1406. The mass storage device 1418 may consist of one or more physical storage units. The storage controller 1414 may interface with the physical storage units through a serial attached SCSI ("SAS") interface, a serial advanced technology attachment ("SATA") interface, a fiber channel ("FC") interface, or other standard interface for physically connecting and transferring data between computers and physical storage devices.

The computer 1402 may store data on the mass storage device 1418 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 1418 is characterized as primary or secondary storage, and the like. For example, the computer 1402 may store information to the mass storage device 1418 by issuing instructions through the storage controller 1414 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1402 may further read information from the mass storage device 1418 by detecting the physical states or characteristics of one or more particular locations within the physical storage units.

In addition to the mass storage device 1418 described above, the computer 1402 may have access to other computer-readable storage medium to store and retrieve information, such as program modules, data structures, or other data. It should be appreciated by those skilled in the art that computer-readable storage media can be any available media that may be accessed by the computer 1402. By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information.

The mass storage device 1418 may store an operating system 1420 utilized to control the operation of the computer 1402. According to one embodiment, the operating system comprises the LINUX operating system. According to another embodiment, the operating system comprises the WINDOWS® SERVER operating system from MICROSOFT Corporation of Redmond, Wash. According to further embodiments, the operating system may comprise the UNIX or SOLARIS operating systems. It should be appreciated that other operating systems may also be utilized.

The mass storage device 1418 may store other system or application programs and data utilized by the computer 1402, such as the grouping module 130 described above in regard to FIG. 1. In one embodiment, the mass storage device 1418 or other computer-readable storage media may be encoded with computer-executable instructions that, when loaded into the computer 1402, may transform the computer from a general-purpose computing system into a special-purpose computer capable of implementing the embodiments described herein. These computer-executable instructions transform the computer 1402 by specifying how the CPUs 1404 transition between states, as described above. According to one embodiment, the computer 1402 may have access to computer-readable storage media storing computer-executable instructions that, when executed by the computer, perform the routines 1200 and 1300 for grouping products by size and weight, as described above in regard to FIGS. 12 and 13.

The computer 1402 may also include an input/output controller 1422 for receiving and processing input from a number of input devices 1424, such as a keyboard, a mouse, a touchpad, a touch screen, an electronic stylus, or other type of input device. Similarly, the input/output controller 1422 may provide output to a display device 1426, such as a computer monitor, a flat-panel display, a digital projector, a printer, a plotter, or other type of output device. It will be appreciated that the computer 1402 may not include all of the components shown in FIG. 14, may include other components that are not explicitly shown in FIG. 14, or may utilize an architecture completely different than that shown in FIG. 14.

Based on the foregoing, it should be appreciated that technologies for grouping products by size and weight are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting.

Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A non-transitory computer-readable storage medium having computer-executable instructions stored thereon that, when executed by a computer, cause the computer to:

send a customer-facing user interface to a user computer, the customer-facing user interface configured to allow a user of the user computer to browse and search a plurality of products;

send an extension to the customer-facing user interface to the user computer that is delivered only to a limited set of authorized users, the extension to the customer-facing user interface configured to allow the user to designate at least two products as having similar size and weight;

receive data from the extension to the customer-facing user interface identifying the at least two products designated by the user as having similar size and weight from the user computer, wherein a first product of the at least two products has dimensional data stored in an inventory item corresponding to the first product and a second product of the at least two products does not have dimensional data stored in an inventory item corresponding to the second product;

create a product group specifying the at least two products designated as having similar size and weight;

programmatically determine a source product for the product group, wherein the source product provides dimensional data for the other products specified in the product group; and store a specification of the source product in the product group.

2. The non-transitory computer-readable storage medium of claim 1, wherein the extension to the customer-facing user interface comprises one or more group boxes, and wherein designating the at least two products as having similar size and weight comprises dragging representations of at least two products from a list of the plurality of products in the customer-facing user interface into one of the one or more group boxes.

3. The non-transitory computer-readable storage medium of claim 1, wherein programmatically determining a source product for the product group comprises selecting a product from the products specified in the product group having a most recent measurement date regarding the dimensional data.

4. The non-transitory computer-readable storage medium of claim 1, wherein the dimensional data of the source product comprises a weight and at least one of a length, a width, and a height of the source product.

5. The non-transitory computer-readable storage medium of claim 1, having additional computer-executable instructions stored thereon that cause the computer to:

send a second user interface to the user computer, the second user interface configured to allow the user of the user computer to view a list of products in the product group, the list of products comprising an indication of the source product for the product group and an indication of whether each of the other products in the product group have dimensional data stored in the inventory item corresponding to the product.

6. A computer-implemented method for grouping products having similar size and weight, the method comprising:

generating instructions for rendering a user interface on a user computer, the user interface configured to allow a user to identify at least two products having similar size and weight using a customer-facing portion of the user interface, the customer-facing portion of the user interface configured to allow the user to browse and search a plurality of products, and group the at least two products having similar size and weight together through an extension to the customer-facing portion of the user interface that is delivered only to a limited set of authorized users;

receiving data from the extension to the customer-facing portion of the user interface identifying the grouped at least two products identified by the user as having similar size and weight from the user interface, wherein a first product of the at least two products has dimensional data stored in an inventory item corresponding to the first product and a second product of the at least two products does not have dimensional data stored in an inventory item corresponding to the second product;

creating a product group specifying the grouped at least two products;

programmatically determining a source product for the product group, wherein the source product provides dimensional data for the other products specified in the product group; and storing a specification of the source product in the product group.

7. The computer-implemented method of claim 6, wherein the extension to the customer-facing portion of the user interface comprises one or more group boxes, and wherein grouping the at least two products having similar size and weight together comprises dragging representations of the at least two products from a list of the plurality of products in the customer-facing portion of the user interface into one of the one or more group boxes.

8. The computer-implemented method of claim 6, wherein programmatically determining a source product for the product group comprises selecting a product from the products specified in the product group having a most recent measurement date regarding the dimensional data.

9. The computer-implemented method of claim 6, wherein the dimensional data of the source product comprises a weight and at least one of a length, a width, and a height of the source product.

10. The computer-implemented method of claim 6, further comprising:

generating instructions for rendering a second user interface on the user computer, the second user interface configured to allow the user of the user computer to view a list of products in the product group, the list of products comprising an indication of the source product for the product group and an indication of whether each of the other products in the product group have dimensional data stored in the inventory item corresponding to the product.

11. A computer-implemented method for grouping products having similar size and weight, the method comprising performing instructions under the control of a computer system for:

receiving at the computer system a list of products designated by a user as having similar size and weight using an extension to a customer-facing user interface configured to allow the user to browse or search through a plurality of products and designate the list of products from the plurality of products as having similar size and weight and made available only to a limited set of authorized users, wherein a first product in the list of products has dimensional data stored in an inventory item corresponding to the first product and a second product in the list of products does not have dimensional data stored in an inventory item corresponding to the second product;

creating a product group on the computer system specifying each product in the list of products; and programmatically determining a source product for the product group, wherein the source product provides dimensional data for the other products specified in the product group.

12. The computer-implemented method of claim 11, wherein the extension to the customer-facing user interface comprises one or more group boxes, and wherein the extension to the customer-facing user interface is configured to allow the user to drag representations of at least two products from the plurality of products into one of the one or more group boxes designating the at least two products to have similar size and weight.

13. The computer-implemented method of claim 11, wherein programmatically determining a source product for the product group comprises selecting a product from the products specified in the product group having a most recent measurement date regarding the dimensional data.

14. The computer-implemented method of claim 11, wherein the dimensional data of the source product comprises a weight and at least one of a length, a width, and a height of the source product.

15. The computer-implemented method of claim 11, wherein all of the products in the list of products designated as having similar size and weight have substantially the same size and weight.

16. A system for grouping products by size and weight, the system comprising:

a customer-facing user interface delivered to a user computer and configured to allow a user of the user computer to browse and search a plurality of products;

an extension to the customer-facing user interface delivered to the user computer and configured to allow the user to designate at least two products as having similar size and weight, the extension to the customer-facing user interface being made available to a limited set of authorized users; and a grouping module executing on a server computer and configured to receive data identifying the at least two products designated by the user as having similar size and weight from the user computer, wherein a first product of the at least two products has dimensional data stored in an inventory item corresponding to the first product and a second product of the at least two products does not have dimensional data stored in an inventory item corresponding to the second product, create a product group specifying each of the at least two products designated as having similar size and weight, and programmatically determine a source product for the product group, wherein the source product provides dimensional data for the other products specified in the product group.

17. The system of claim 16, wherein the extension to the customer-facing user interface comprises one or more group boxes, and wherein designating the at least two products as having similar size and weight comprises dragging representations of the at least two products from a list of the plurality of products in the customer-facing user interface into one of the one or more group boxes.

18. The system of claim 16, wherein programmatically determining a source product for the product group comprises selecting a product from the products specified in the product group having a most recent measurement date regarding the dimensional data.

19. The system of claim 16, further comprising a second user interface delivered to the user computer and configured to allow the user of the user computer to view a list of products in the product group, the list of products comprising an indication of the source product for the product group and an indication of whether each of the other products in the product group have dimensional data stored in the inventory item corresponding to the product.

* * * * *